US012644820B2

(12) United States Patent
Hoehse et al.

(10) Patent No.: US 12,644,820 B2
(45) Date of Patent: Jun. 2, 2026

(54) FLOW CELL ASSEMBLY AND SPECTROSCOPY DEVICE ASSEMBLY FOR USE IN A BIOPROCESS

(71) Applicant: Sartorius Stedim Biotech GmbH, Goettingen (DE)

(72) Inventors: Marek Hoehse, Goettingen (DE); Thomas Regen, Goettingen (DE); Christian Grimm, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 811 days.

(21) Appl. No.: 17/912,453

(22) PCT Filed: Apr. 1, 2021

(86) PCT No.: PCT/EP2021/058634
§ 371 (c)(1),
(2) Date: Sep. 16, 2022

(87) PCT Pub. No.: WO2021/198427
PCT Pub. Date: Oct. 7, 2021

(65) Prior Publication Data
US 2023/0168179 A1 Jun. 1, 2023

(51) Int. Cl.
*G01N 15/1434* (2024.01)
*G01N 21/05* (2006.01)

(52) U.S. Cl.
CPC ......... *G01N 15/1436* (2013.01); *G01N 21/05* (2013.01)

(58) Field of Classification Search
None
See application file for complete search history.

(56) References Cited

U.S. PATENT DOCUMENTS

| | | | |
|---|---|---|---|
| 4,113,390 A | 9/1978 | Levine | |
| 4,726,678 A | 2/1988 | Hutsch et al. | |

(Continued)

FOREIGN PATENT DOCUMENTS

| CN | 103620378 A | 3/2014 |
|---|---|---|
| DE | 102010044237 A1 | 3/2012 |

(Continued)

OTHER PUBLICATIONS

Translation of RU 2717207 C1 (Year: 2020).*

(Continued)

*Primary Examiner* — Rufus L Phillips
(74) *Attorney, Agent, or Firm* — Dilworth IP, LLC

(57) ABSTRACT

A flow cell assembly for use in a bioprocess including a housing and a glass body. The housing includes an inlet tube connector and an outlet tube connector and a holding structure for immovably holding the glass body. The glass body is a universal single-piece glass body surrounding a measurement channel. The measurement channel has an inlet end and an outlet end defining a medium flow direction, and a defined dimension along an optical measurement axis perpendicular to the medium flow direction. The inlet end and outlet end of the measurement channel are in fluid communication with the inlet tube connector and the outlet tube connector of the housing, respectively. The housing or the glass body includes an aligning structure for aligning a probe head. The housing or the glass body includes a fixing structure for immovably fixing the aligned probe head relative to the glass body.

17 Claims, 7 Drawing Sheets

(56) References Cited

U.S. PATENT DOCUMENTS

| | | | |
|---|---|---|---|
| 5,351,686 A | 10/1994 | Steuer et al. | |
| 5,385,539 A * | 1/1995 | Maynard | G01N 21/51 |
| | | | 604/6.08 |
| 5,414,508 A | 5/1995 | Takahashi et al. | |
| 6,009,339 A | 12/1999 | Bentsen et al. | |
| 6,104,483 A * | 8/2000 | Sebok | G01N 21/05 |
| | | | 356/244 |
| 7,961,310 B1 | 6/2011 | Milosevic | |
| 8,189,187 B2 * | 5/2012 | Graham | C03B 23/047 |
| | | | 356/246 |
| 8,859,990 B2 | 10/2014 | Ng et al. | |
| 9,404,849 B2 | 8/2016 | Wynn | |
| 10,731,123 B2 | 8/2020 | Ingber et al. | |
| 2003/0049858 A1 * | 3/2003 | Golden | G01N 21/65 |
| | | | 436/171 |
| 2007/0131018 A1 * | 6/2007 | Alspach | G01N 21/05 |
| | | | 73/1.16 |
| 2010/0269940 A1 | 10/2010 | Wynn et al. | |
| 2012/0119101 A1 | 5/2012 | Wynn | |
| 2013/0256557 A1 * | 10/2013 | Tokhtuev | G01N 21/645 |
| | | | 250/438 |
| 2014/0103224 A1 | 4/2014 | Ng et al. | |
| 2015/0085290 A1 | 3/2015 | Fjerdingstad | |
| 2018/0080000 A1 | 3/2018 | Ingber et al. | |
| 2020/0386669 A1 * | 12/2020 | Lahdesmaki | G01N 21/05 |
| 2021/0164889 A1 * | 6/2021 | Massey | G01N 29/2418 |

FOREIGN PATENT DOCUMENTS

| | | | | |
|---|---|---|---|---|
| JP | 53-116187 A | 10/1978 | | |
| JP | 62-075335 A | 4/1987 | | |
| JP | 02-115749 A | 4/1990 | | |
| JP | 2001-513676 A | 9/2001 | | |
| JP | 2013-024780 A | 2/2013 | | |
| JP | 2016-503649 A | 2/2016 | | |
| RU | 2717207 C1 * | 3/2020 | | A61M 16/08 |
| WO | 9427495 A1 | 12/1994 | | |

OTHER PUBLICATIONS

Email from Endress+Hauser Group Services dated Oct. 13, 2023.
Tornado Spectral Systems website, retrieved on Nov. 9, 2023
(https://tornado-spectral.com/products/hudson-probe-with-micro-flow-cell/).

* cited by examiner

A-A

B-B

FLOW CELL ASSEMBLY AND SPECTROSCOPY DEVICE ASSEMBLY FOR USE IN A BIOPROCESS

FIELD OF THE INVENTION

The invention relates to a flow cell for use in a bioprocess, especially in a downstream process. The invention further relates to a spectroscopy device assembly for use in a bioprocess.

BACKGROUND

Therapeutic cell manufacturing processes can be separated into upstream processes (fermentation processes incorporating dispensing, media preparation, and cell culture) and downstream processes (purification of the products). A current challenge in downstream bioprocessing is the ability to analyze critical quality attributes. Especially target protein, DNA, protein aggregation and HCP (host cell protein) are important parameters which are often measured offline throughout the process chain.

Optical techniques for analyzing of such parameters are mostly limited to the detection of single or dual wavelengths, e.g. the UV absorbance at about 280 nm for the detection of protein. The measurement is usually made in a cuvette by a spectrophotometer or photometer. A collimated beam of light is directed onto a sample and passes through the sample with a defined optical path length. Absorbance is determined as the ratio of the light applied from the source to the light after interaction with the sample (transmission or reflection measurement).

However, there are no solutions available for an integration of broadband ultraviolet-visible (UV-Vis) spectroscopy measurements into downstream processing, least of all in single-use process equipment. The same is true for other spectroscopic techniques, such as fluorescence or near-infrared (NIR) spectroscopy.

According to a known approach, UV transmission measurements are performed with varying optical path lengths. The optical path length variation is achieved by a moving fiber which allows optical path lengths in the μm to mm range. The advantage of this approach is a broad linear range for the detection of protein. The disadvantage is that the alignment of the fiber has to be done with high accuracy and reproducibility and is therefore a very time-consuming process. Accordingly, this alignment technique is not suitable for on-line or in-line measurements in a running process, since no measurement can be taken during alignment of the fiber position. Moreover, the transfer of this measuring technique to single-use equipment would be rather complex due to the moving parts and the required accuracy of the fiber positioning.

Further, spectral data can beneficially be used for calibration. In particular, calibration is required if spectral raw data or information (spectra) are to be transferred to quantitative analyte predictions.

SUMMARY

It is an object of the invention to effectively use or integrate spectroscopy in or into a bioprocess. It is a further object of the invention to effectively use spectroscopy in a calibration related to a bioprocess.

The above problem is solved by a flow cell assembly according to claim 1. Advantageous and expedient embodiments of the invention are apparent from the dependent claims.

The invention provides a flow cell assembly for use in a bioprocess. The flow cell assembly comprises a housing and a glass body. The housing includes an inlet tube connector and an outlet tube connector. The housing further includes a holding structure for immovably holding the glass body. The glass body is a universal single-piece glass body, preferably made of quartz glass, surrounding a measurement channel. The measurement channel has an inlet end and an outlet end defining a medium flow direction. The measurement channel has a defined dimension along an optical measurement axis perpendicular to the medium flow direction. The inlet end of the measurement channel is in fluid communication with the inlet tube connector of the housing. The outlet end of the measurement channel is in fluid communication with the outlet tube connector of the housing. The housing or the glass body includes an aligning structure for aligning a probe head. The housing or the glass body includes a fixing structure for immovably fixing the aligned probe head relative to the glass body.

The invention is based on the finding that glass bodies can be produced precisely enough in one piece, in particular by special cold casting techniques. This means that the glass body is not assembled by joining separate pieces together or the like. Especially, the measurement channel in the glass body is not machined or milled out afterwards. This manufacturing method ensures a fixed and defined optical path length, which is crucial for optical measurements, especially for transmission measurements as path length variations are directly linked to the spectral response. In the flow cell assembly according to the invention this optical path length is the height of the measurement channel along the optical measurement axis. (It is to be noted that the alternative of having standard glass windows in a plastic body does not result in similar path lengths.)

The design of the monolithic glass body with the precisely defined optical path length can be established as standard design for a series of flow cell assemblies. It is then not necessary to determine the optical path length of each individual glass body as manufacturing reproducibility is sufficient to assume identical optical path lengths for all glass bodies manufactured with the same equipment according to the same manufacturing process. Thus, each glass body can be used in different flow cell assemblies and/or several times in the same assembly without the need of any adjustments or calibration of the flow cell assembly before use. Due to the always known defined optical path length, measurement uncertainties are minimized.

The measurement channel formed in the glass body of the flow cell assembly can form a portion of the main process flow path (or a branch thereof) through which the process medium flows while the bioprocess is running. It is thus possible to fully integrate the flow cell assembly into the process flow path of the bioprocess and to perform on-line and even in-line monitoring of certain parameters of the process medium.

According to the invention, the optical measurements are performed in the measurement channel where the process medium flows through during the running bioprocess, rather than in a separate or remote measurement chamber. Therefore, the flow of the process medium is not impeded and does not have to be halted when the measurements are made. This is important, especially when the flow cell assembly is used during cell harvest. The cells in the process medium are not exposed to significant shear stress, and no aggregation is induced, which would adversely affect the cell characteristics (morphology, size etc.).

However, the application of the flow cell assembly according to the invention is not generally limited to downstream bioprocesses. Rather, the flow cell assembly, especially a single-use version of the assembly, can also be used in an upstream perfusion bioprocess to detect various parameter for monitoring and control of the process. Generally, it is advantageous to arrange the flow cell assembly upstream of a filter element in a bypass channel. In this case, the preferred spectroscopic technique is Raman spectroscopy, while the use of other spectroscopic techniques is not generally excluded.

A typical location of a flow cell assembly in an upstream perfusion bioprocess is in a harvest line behind the cell retention system, either external (e.g. in a tube line) or internal (e.g. in a bag). Possible cell retention systems include tangential flow filtration (TFF), alternating tangential filtration (ATF), acoustic, gravimetric (settler) and hydrocyclone systems). Typical analytes to monitor in a harvest line are nutrients, metabolites and titer. For process control, the nutrient predictions can further be used for feed control.

Another typical location of a flow cell assembly in an upstream perfusion bioprocess is in a bleed line. Typical analytes to monitor in a bleed line are certain cell properties or cell-related properties and parameters, e.g. total cell count (TCC), viable cell density (VCD), cell viability, biomass, cell size, wet cell weight), and titer. For process control the bleed rate can be controlled based on the prediction of certain properties.

One of the basic concepts of the invention is that—from a functional point of view—the glass body surrounding the measurement channel with the defined optical path length is decoupled from the inlet and outlet tube connectors of the housing and therefore independent of any tube dimensions. This means that, in principle, for each tube size (diameter) the same flow cell optics (glass body) are assembled with a housing containing the respective inlet and outlet tube connectors of the required size.

The inlet and outlet tube connectors are preferably formed as tri-clamp flanges or hose barbs or according to another standard connection technique for an easy insertion of the flow cell assembly into a process line of the bioprocess.

The aligning and fixing structures of the housing or the glass body can also be established as standardized structures for a series of flow cell assemblies. It is thus ensured that a probe head of an optical probe is always placed in the same defined position and orientation relative to the measurement channel so that the conditions of each measurement are the same, irrespective of which flow cell assembly of the series is actually used.

It is to be noted that the aligning structure and the fixing structure can be the same (identical). This means that one common structure fulfills both the function of aligning a probe head and the function of immovably fixing the probe head relative to the glass body at the same time.

Further, the aligning structure and the fixing structure may include separate components like a bracket, a clamp or the like.

Especially in a single-use version of the flow cell assembly according to the invention, the housing is made of a plastic material and suitable for beta, gamma or X-ray irradiation. According to a further or another aspect, the housing is preferably made of a material suitable for steam sterilization and/or suitable for sanitization, e.g. by sodium hydroxide (NaOH) or ethylene oxide. This means that the material properties and the function of the housing are not impaired by the impact of the sterilization and/or sanitation means and techniques.

The probe head of the optical probe is preferably fixed to the fixing structure by means of a lock-in-place connection. This means that during the locking action it is ensured that the probe head is urged into and precisely kept in a predefined position and orientation. The lock-in-place connection ideally is a one-click connection which can do without any screws or other additional parts.

According to the invention, the probe head of the optical probe is immovably fixed relative to the glass body. This means that after fixing the probe head no relative movement between the probe head and the glass body is possible, at least not to an extent that would cause significant spectral variation. In any event, the probe head does not have to be permanently fixed to the housing. Rather, it is preferred that the probe head is detachably fixed. In practice, after all measurements have been made, the probe head is removed from the housing or glass body of the flow cell assembly and is thus available for further applications. In any event, as long as it is aligned and fixed, the probe head remains immovable relative to the glass body.

Depending on the design of the housing and the glass body, it may be expedient to provide the housing with a securing structure for securing the glass body against removal during use. The securing structure can be an integral portion of the housing or a separate part which is, for example, clamped between the glass body and an adjacent portion of the housing.

According to an advantageous design of the housing of the flow cell assembly, the housing comprises a main body and a separate locking clip serving as the securing structure. The locking clip takes a defined position relative to the main body and the glass body after insertion into a receptacle of the main body. The locking clip includes at least one of the following: the holding structure, the aligning structure for aligning the probe head, the fixing structure for immovably fixing the aligned probe head. However, the fixing structure is preferably part of the main body of the housing.

According to an advantageous aspect of the invention, the medium flow direction through the measurement channel of the glass body is identical with the main process flow direction of the process medium, which is defined by the inlet tube connector and the outlet tube connector. This ensures that any deflection of the process medium is avoided while it flows through the flow cell assembly.

Further, in order to avoid an undesired pressure build-up at the measurement channel, the cross-sectional areas of the inlet tube connector, the outlet tube connector and the measurement channel are substantially the same. This concordance of the cross-sectional areas is especially practical in small-scale applications where all of the process medium can smoothly be guided through the measurement channel of the flow cell assembly.

The inlet and outlet tube connectors usually have a circular cross-section with a diameter greater than the preferred optical path length, i.e. the dimension of the measurement channel in the optical measuring direction (height). In order to still maintain a similar cross-sectional area for the process medium on its way through the flow cell assembly, the width of the measurement channel is increased accordingly. In other words, compared to a mean diameter of the inlet tube connector and the outlet tube connector, the dimension of the measurement channel along the optical measurement axis is smaller, but a dimension of the measurement channel in a direction perpendicular both to the medium flow direction and to the optical measurement axis is greater.

An especially advantageous aspect of the invention is the flexible applicability of the universal glass body (flow cell optics) in applications of different scale level. The diameter of the inlet and outlet tube connectors of the housing are comparatively large in large-scale applications. In such a use case it is not possible to let all of the process medium flow through the measurement channel without a significant, undesired increase in pressure. Therefore, in a dedicated large-scale embodiment of the flow cell assembly, the housing includes a bypass channel. The bypass channel is in fluid communication with the inlet tube connector and the outlet tube connector, thus circumventing the measurement channel. The process medium fed into to the housing of the flow cell assembly is split into one portion flowing through the measurement channel and another portion flowing through the bypass channel. Due to the bypass channel it is possible to use the same optics (glass body) with the same optical path length for the measurements as in a small-scale applications. This is particularly beneficial because, under this prerequisite, established mathematical models of the measured parameters can be transferred between the different scales.

In order to ensure a smooth flow of the process medium through a flow cell assembly including a bypass channel, the overall cross-sectional area of the measurement channel and the by bypass channel should be about equal to a mean cross-sectional area of the inlet tube connector and the outlet tube connector. A deviation between the combined cross-sectional areas of the measurement channel and the by bypass channel on the one hand and the mean cross-sectional area of the inlet and outlet tube connectors on the other hand are preferably less than 25%, more preferably less than 10%.

In case of gas bubbles being present in the process medium, it is desired that the bubbles do not enter the measurement channel as they could obstruct the optical measurements. Therefore, according to an advantageous use of the flow cell assembly, in its operating position the orientation of the flow cell assembly is such that the bypass channel extends in an area vertically above the measurement channel. This orientation of the flow cell assembly allows the gas bubbles to ascend into the bypass channel and to keep the measurement channel free of gas bubbles, or at least it reduces the occurrence of gas bubbles in the measurement channel.

The invention further provides a spectroscopy device assembly for use in a bioprocess. The spectroscopy device assembly comprises a flow cell assembly as defined further above and a spectrometer coupled to the flow cell, in particular to the optical probe (head). The spectrometer itself can be a UV-Vis spectrometer, an NIR spectrometer, a fluorescence spectrometer or a Raman spectrometer.

BRIEF DESCRIPTION OF THE DRAWINGS

Further features and advantages of the invention will become apparent from the following description and from the accompanying drawings to which reference is made. In the drawings.

DETAILED DESCRIPTION

Figure 1:
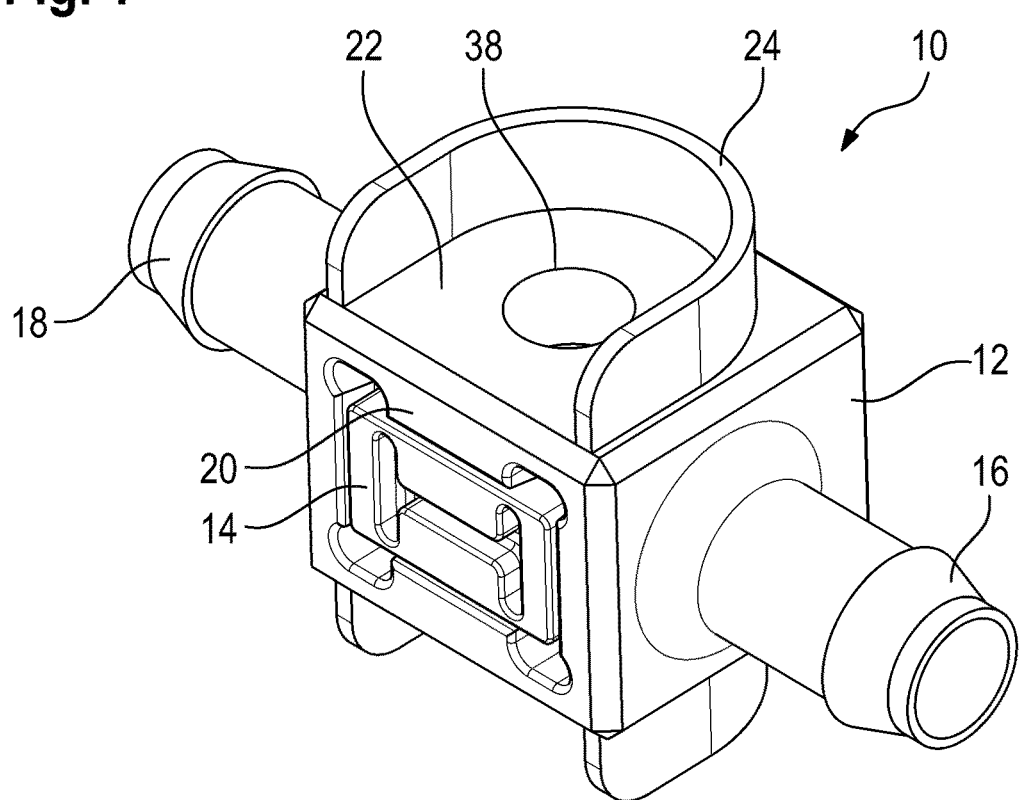
FIG. 1 shows a first perspective view of a first embodiment of a flow cell assembly according to the invention.
Figure 2:
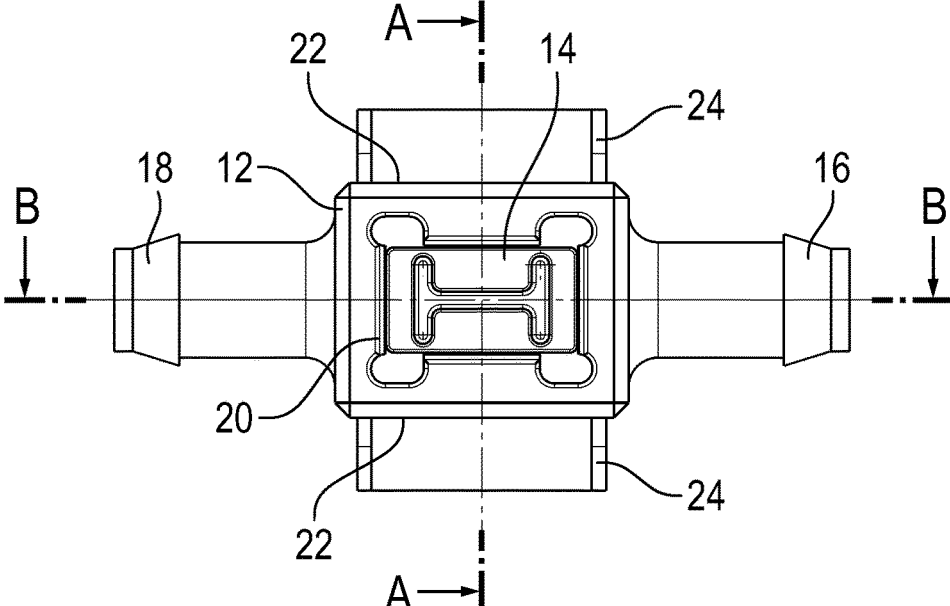
FIG. 2 shows a front view of the flow cell assembly according to FIG. 1.
Figure 3:
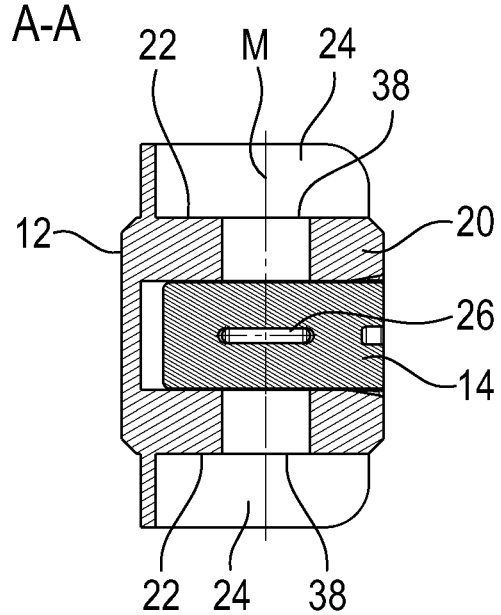
FIG. 3 shows a sectional view of the flow cell assembly according to FIG. 2 along sectional plane A-A.
Figure 4:
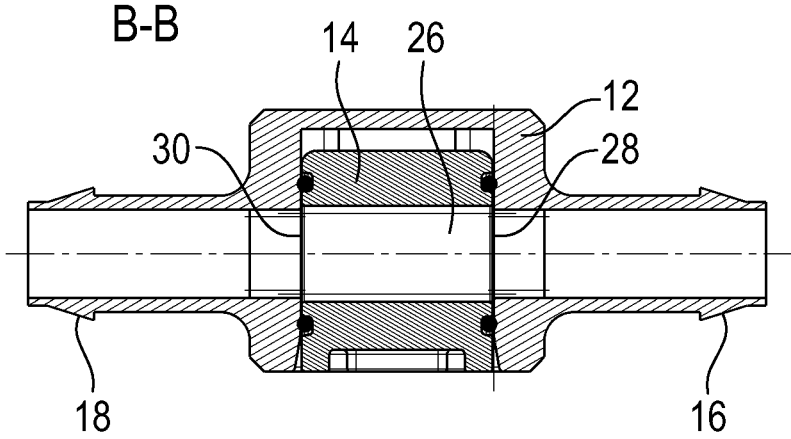
FIG. 4 shows a sectional view of the flow cell assembly according to FIG. 2 along sectional plane B-B.
Figure 5:
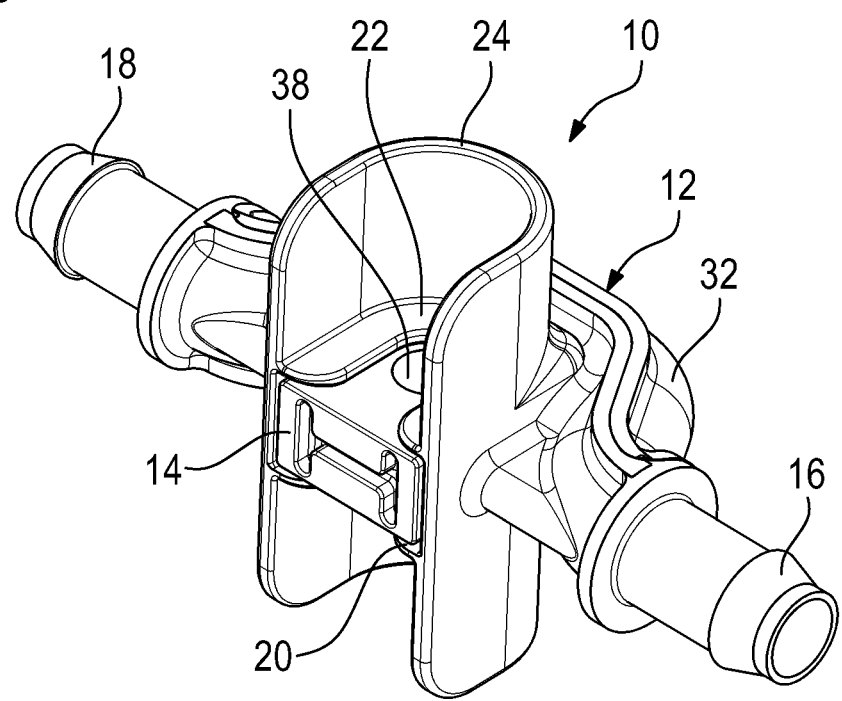
FIG. 5 shows a first perspective view of a second embodiment of a flow cell assembly according to the invention.
Figure 6:
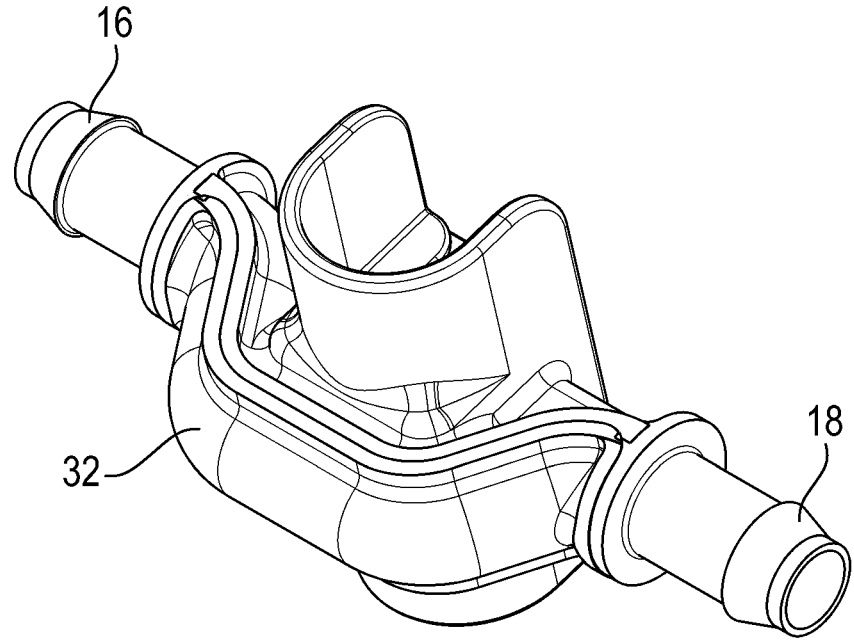
FIG. 6 shows a second perspective view of the flow cell assembly according to FIG. 5.
Figure 7:
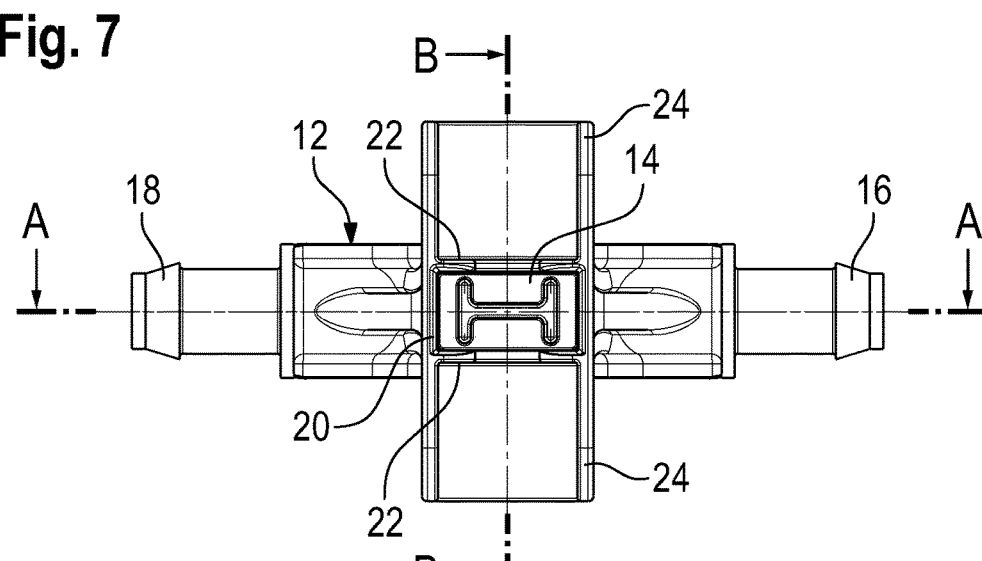
FIG. 7 shows a front view of the flow cell assembly according to FIG. 5.
Figure 8:
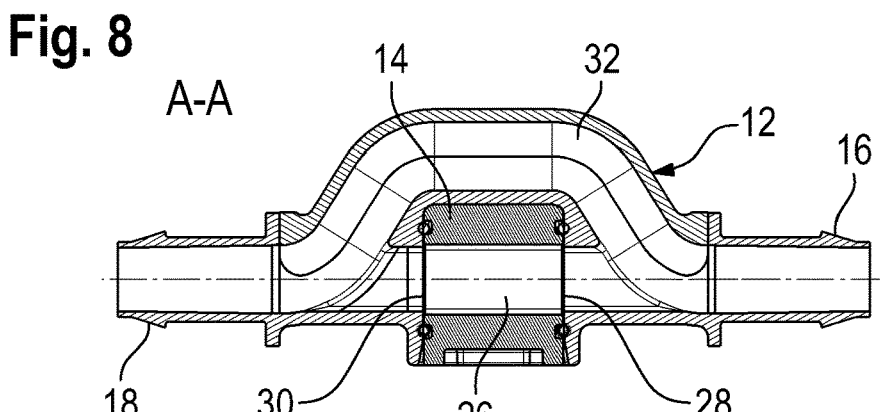
FIG. 8 shows a sectional view of the flow cell assembly according to FIG. 7 along sectional plane A-A.
Figure 9:
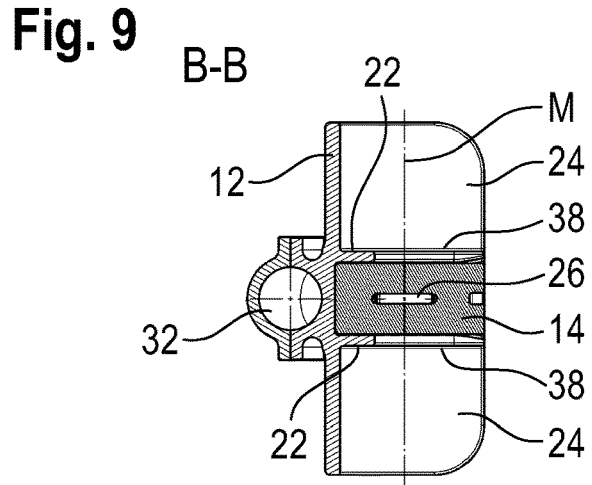
FIG. 9 shows a sectional view of the flow cell assembly according to FIG. 7 along sectional plane B-B.

FIGS. 1 to 4 show a first embodiment of a single-use flow cell assembly 10 for use in a bioprocess, especially in a downstream process. The flow cell assembly 10 includes two main components: a housing 12 and a glass body 14.

The housing 12 is completely made of a plastic material which can be sterilized, especially by gamma radiation. The housing 12 can be manufactured as a single piece, e.g. by 3D printing, or it can include two or more separate pieces, produced e.g. by injection molding, which are assembled together.

The housing 12 includes an inlet tube connector 16 and an outlet tube connector 18, both opening into the interior of the housing 12, so that the flow cell assembly 10 can be integrated into a process medium line of a bioprocess set-up, especially into a downstream process line. The inlet and outlet tube connectors 16, 18 can be designed as hose barbs or as tri-clamp flange portions, for example. Since the embodiment shown in FIGS. 1 to 4 is configured for small-scale applications, the diameter of the inlet and outlet tube connectors 16, 18 is comparatively small, e.g. in the range of ⅛ inch (0.32 cm).

The housing 12 further includes a holding structure 20 for holding the glass body 14. In particular, the housing 12 has a receptacle for accommodation of the glass body 14. The shapes of the receptacle and the glass body 14 are adapted to each other such that the glass body 14 cannot move relative to the housing. This can be accomplished by a form fit and/or by clamping and/or by a latch mechanism or the like. Another option is an additional (integrated or separate) securing structure (not shown) that keeps the glass body 14 in place.

The housing 12 also includes an aligning structure 22 for aligning a probe head and a fixing structure 24 for immovably fixing the aligned probe head relative to the glass body. As will be explained in detail later, the aligning structure 22 is shaped such that it receives a head of an optical probe in a defined position and orientation. The aligning structure 22 may include flat, smooth surfaces and/or specifically shaped surfaces which are adapted to corresponding or matching surfaces of the probe head.

The fixing structure 24 is used to temporarily or permanently fix the probe head in the defined position and orientation. In the fixed state, the probe head is immovable relative to the housing 12 and to the glass body 14. (From a functional point of view, it is only necessary that the probe head is immovable relative to the glass body 14.) The fixing structure 24 provides a clamp connection or a lock-in-place connection for the probe head.

The glass body 14 is made of quartz glass and produced as a single piece by cold casting. If at all possible, other materials and/or manufacturing methods resulting in the same precisely defined dimensions and characteristics of the monolithic glass body 14 could also be used. In general, the glass body 14 should be transparent in average for more than 50% of the incident radiation with respect to the relevant measuring frequency range (e.g. UV~200-380 nm, more specific 250-320 nm). Examples for such materials include quartz ($SiO_2$); sapphire; borosilicate glass (BK7); fused silica; calcium fluoride ($CaF_2$); magnesium fluoride ($MgF_2$); polymer glass like substrates like polytetrafluoroethylene (PTFE), polymethyl methacrylate (PMMA, acrylic glass), polycarbonate (PC).

A measurement channel 26 extends through the glass body 14, i.e. the glass body 14 peripherally surrounds the measurement channel 26. At least a central portion of the measurement channel 26 is straight and has a constant, basically rectangular cross-section.

The two ends of the measurement channel 26 define a medium flow direction. As will be explained later, the process medium flows through the measurement channel 26 during measurements performed in the flow cell assembly 10. Accordingly, one of the ends can be referred to as an inlet end 28 and the other end can be referred to as an outlet end 30.

According to the preferred design of the glass body 14, the rectangular cross-section of the measurement channel is oblong, i.e. it has two strictly parallel long sides and two short sides perpendicular to the long sides, each of the long and the short sides extending perpendicular to the medium flow direction in the measurement channel 26. The long sides of the rectangular cross-section represent the width and the short sides of the cross-section represent the height of the measurement channel 26. Especially the height in the middle of the cross-section of the measurement channel 26 has a defined dimension (distance).

When the glass body 14 is placed and fixed in the housing 12, the inlet end 28 of the measurement channel 26 is in fluid communication with the inlet tube connector 16 of the housing 12 and the outlet end 30 of the measurement channel 26 is in fluid communication with the outlet tube connector 18 of the housing 12. The connections are properly sealed. Thus, the measurement channel 26 forms a portion of a process flow path through which the process medium flows while the bioprocess is running.

It is to be noted that, despite their different shapes, the cross-sectional areas of the inlet and outlet tube connectors 16, 18 and the measurement channel 26 are substantially the same. It is further to be noted that the medium flow direction is not only parallel, but identical with the main process flow direction defined by the inlet and outlet tube connectors 16, 18. Accordingly, no change in pressure occurs and the process medium is not deflected, either, when flowing through the flow cell assembly 10.

The glass body 14 in the housing 12 is orientated such that the short sides of the rectangular cross-section of the measurement channel 26, i.e. the direction of its height, corresponds with an optical measurement axis M of the probe head to be fixed to the housing 12 or the glass body 14 of the flow cell assembly 10.

The aligning and fixing of the probe head will be described later with regard to the second embodiment of the flow cell assembly 10, which is shown in FIGS. 5 to 9.

The set-up of the second embodiment is similar to that of the first embodiment. However, the second embodiment is designed for large-scale applications. Accordingly, the diameter of the inlet and outlet tube connectors 16, 18 is larger than ⅛ inch (0.32 cm).

It is a basic concept of the invention that a universal glass body 14 can be used in different embodiments of the flow cell assembly 10, especially both in small-scale and large-scale applications. Since the cross-sectional area of the measurement channel 26 of the glass body 14 is adapted to small-scale applications, it is not possible in large-scale applications to let all of the process medium flow through the measurement channel 26 without a significant pressure build-up. Therefore, a significant portion of the process medium is allowed to circumvent the measurement channel 26.

In the second embodiment of the flow cell assembly 10 the housing 12 includes a bypass channel 32 which is in fluid communication with the inlet and outlet tube connectors 16, 18. This means that after entering the housing 12 through the inlet tube connector 16, the flow of the process medium is split into a first portion flowing through the measurement channel 26 and a second portion flowing through the bypass channel 32. Before the process medium exits the housing 12 through the outlet tube connector 18, the first and second portions are reunited.

The sum of the cross-sectional areas of the measurement channel 26 and the bypass channel 32 is about equal to the mean cross-sectional area of the inlet and outlet tube connectors 16, 18 in order to maintain an unimpeded flow of the process medium. In particular, due to the concerted cross-sectional areas, no significant pressure difference builds up when the process medium flows through the flow cell assembly 10.

Figure 10:
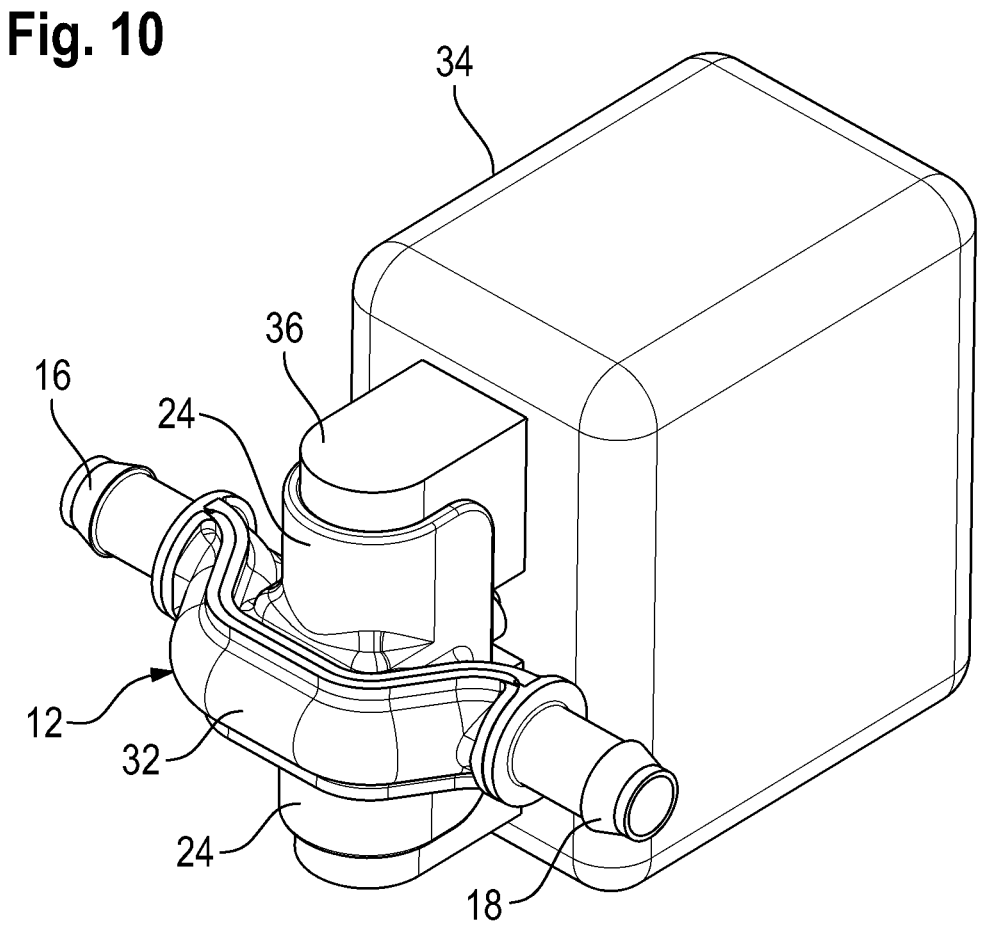
FIG. 10 shows a perspective view of an optical probe fixed to the flow cell assembly according to FIG. 5.

FIG. 10 shows the second embodiment of the flow cell assembly 10 with an optical probe 34 fixed to the housing 12. In particular, a head 36 of the optical probe 34 engages around the housing 12. The probe head 36 is aligned with the aligning structure 22 of the housing 12 and immovably fixed to the housing 12 in a defined position by the fixing structure 24.

In a similar manner, the probe head 36 can be aligned and fixed to the housing 12 of the first embodiment of the flow cell assembly 10. Thus, different embodiments of the flow cell assembly 10 are compatible with the same probe head 36.

Figure 11:
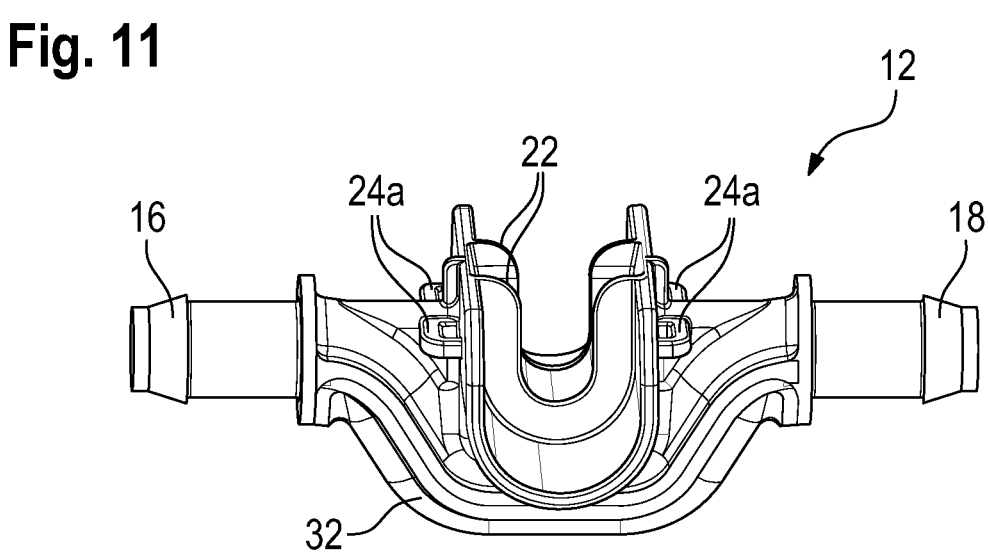
FIG. 11 shows a perspective view of a variant of the second embodiment of the flow cell assembly.

The fixing structure 24 for immovably fixing the probe head 36 can include lugs 24a, for example, as shown in the variant of the second embodiment according to FIG. 11. The lugs 24a are provided on lateral walls of the housing 12 and cooperate with snap-in hooks provided on the probe head 36 (not shown in FIG. 11). Of course, a reverse configuration of the lugs 24a and the hooks is possible. Likewise, other suitable fixing means matching each other can be provided on the housing 12 and on the probe head 36.

The probe head 36 is configured to perform a transmission measurement. The radiation produced by the optical probe 34 passes through the measurement channel 26. Accordingly, the housing 12 of both embodiments has two opposite windows 38 to let the radiation enter and exit the glass body 14, respectively.

However, the design of the housing 12 and the glass body 14 of both embodiments is also, in principle, suitable for measurements in reflection mode and transflection mode. Generally, the flow cell assembly 10 is versatile with regard to optical spectroscopy techniques and does not have to be adapted to each technique.

The optical probe 34 is coupled to a spectrometer (not shown). Depending on the radiation emitted and captured by the optical probe 34, the spectrometer is a UV-Vis spectrometer, an NIR spectrometer, a fluorescence spectrometer or a Raman spectrometer.

Contrary to the illustration of FIG. 10, it may be expedient to ensure that in the operating position of the second embodiment of the flow cell assembly 10 the bypass channel 32 is located vertically above the measurement channel 26. If the process medium contains any gas bubbles, they will tend to travel through the upper bypass channel 32, rather than through the lower measurement channel 26.

Figure 12:
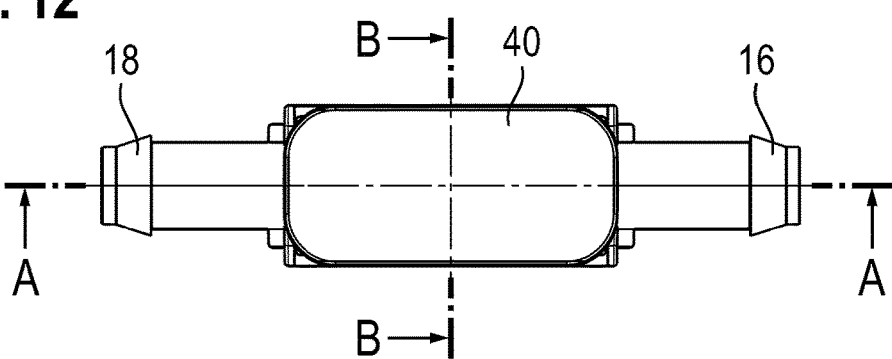
FIG. 12 shows a front view of a third embodiment of the flow cell assembly according to the invention.
Figure 13:
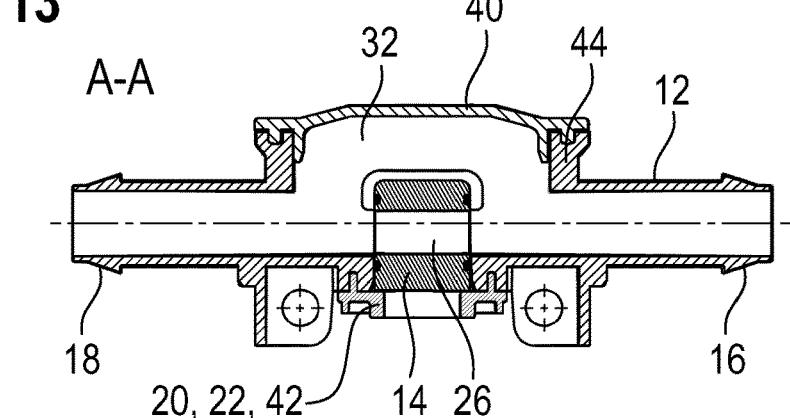
FIG. 13 shows a sectional view of the flow cell assembly according to FIG. 12 along sectional plane A-A.
Figure 14:
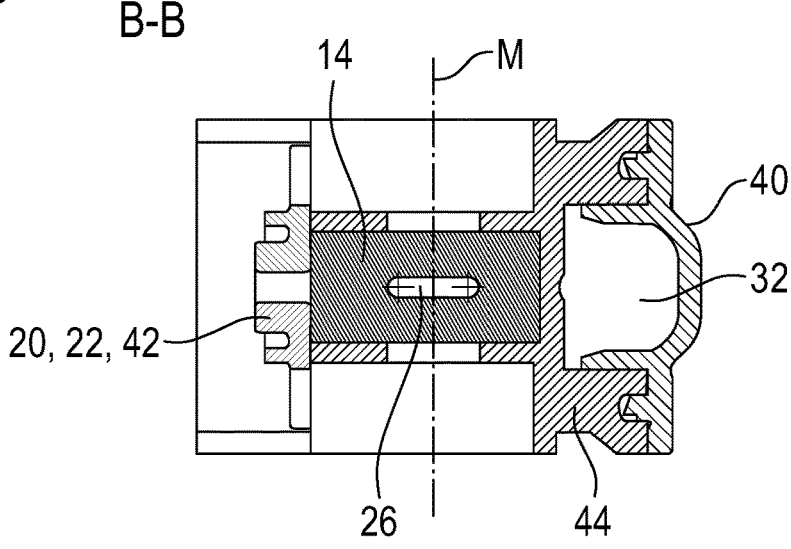
FIG. 14 shows a sectional view of the flow cell assembly according to FIG. 12 along sectional plane B-B.

In FIGS. 12 to 14 a third embodiment of the flow cell assembly 10 is shown which is largely identical with the second embodiment. This means that the third embodiment is also designed for large-scale applications and includes a bypass channel 32 which is in fluid communication with the inlet and outlet tube connectors 16, 18.

The housing 12 of the flow cell assembly 10 includes a lid 40 covering the outer side of the bypass channel 32. On the opposite side of the measurement channel 26, the holding structure 20 of the housing 12 is formed as a separate locking clip 42. The locking clip 42 is inserted into a receptacle of a main body 44 of the housing 12 where it snaps into place in a defined position relative to the main body 44. The locking clip 42 thus not only serves as the holding structure 20 for holding the universal glass body 14 in place, but also as a securing structure preventing inadvertent removal of the glass body 14 from the housing 12 during use of the flow cell assembly 10.

Moreover, the locking clip 42 still has a further function. The locking clip 42 also includes the aligning structure 22 for aligning the probe head 36 relative to the housing 12, while the fixing structure 24 for immovably fixing the probe head 36 to the housing 12 in a defined position is provided on the main body 44 of the housing. In particular, the locking clip 42 includes a structure for centering the probe head 36 relative to the housing 12 and thus relative to the glass body 14.

Figure 15:
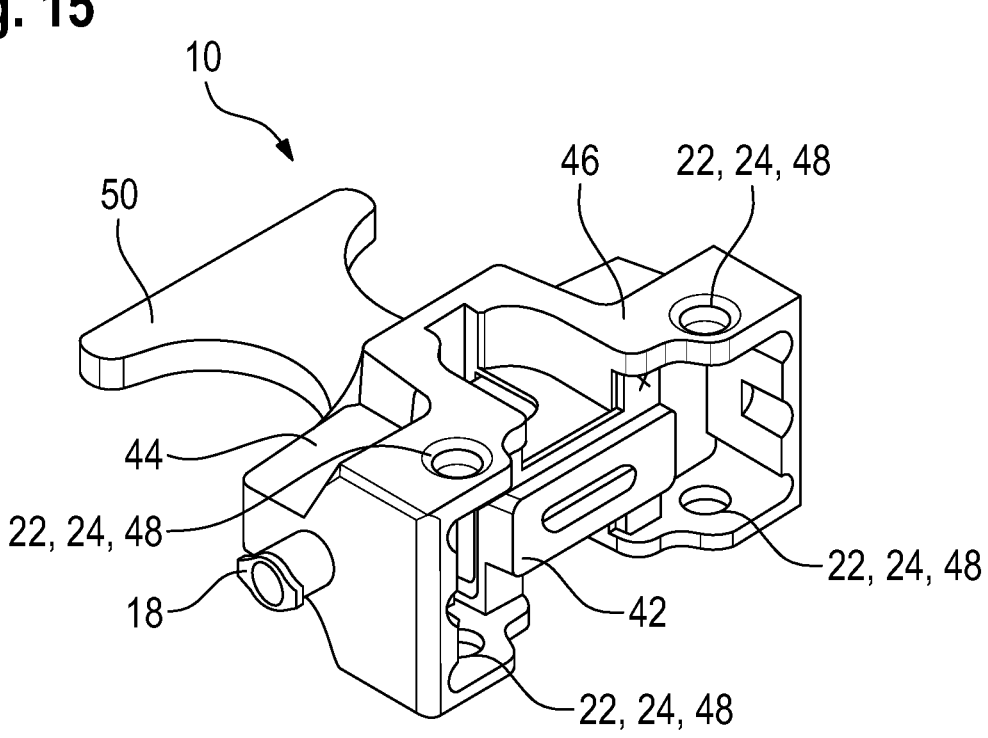
FIG. 15 shows a perspective view of a fourth embodiment of the flow cell assembly according to the invention.
Figure 16:
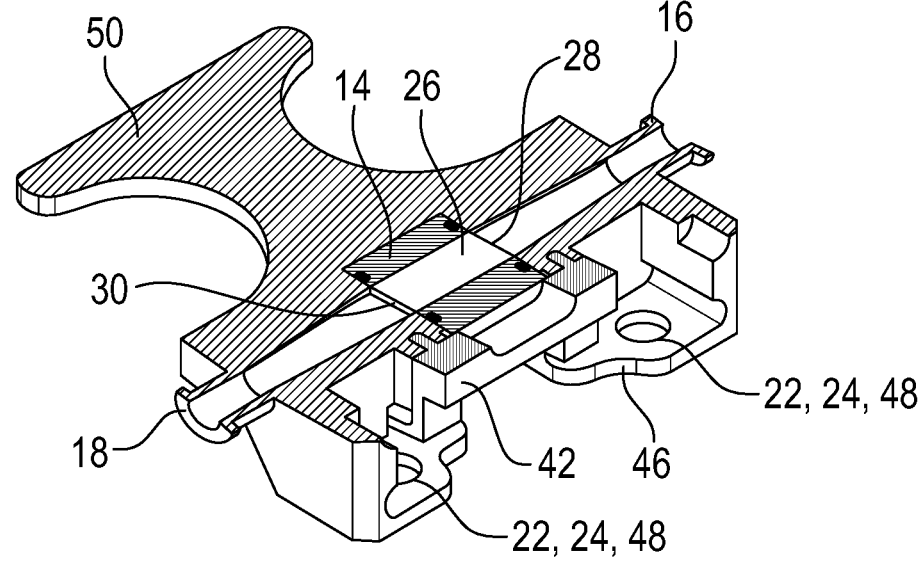
FIG. 16 shows a cut view of the flow cell assembly according to FIG. 15.

In FIGS. 15 and 16 a fourth embodiment of the flow cell assembly 10 is shown which is quite similar to the third embodiment. However, this embodiment is designed for low volumes and therefore lacks a bypass channel. In fact, the height of the measurement channel 26 is in the range of about 1 mm. This embodiment is especially suitable for a calibration related to a bioprocess where only a very small volume of a valuable medium is to be extracted, as will be explained further below.

The inlet and outlet tube connectors 16, 18 of the housing 12 are not formed as barbed connectors as in the previously described embodiments, but as Luer connectors. In addition to its main body 44, the housing 12 includes an attachment portion 46 with two recesses 48 formed in a top section and two opposite recesses 48 formed in a bottom section. The attachment portion 46 can be formed integrally with the main body 44 or firmly connected thereto.

The recesses 48 are designed to receive corresponding spring-loaded pressure members (not shown) provided on the probe head 36 of the optical probe 36. The recesses 48 and the spring-loaded pressure members cooperate to both align and immovably fix the probe head 36 relative to the glass body 14. In other words: both the aligning structure 22 and the fixing structure 24 are realized by the recesses 50 and the spring-loaded pressure members at the same time.

Further, an optional grip or handle 50 can be either integrated into the housing 12 or firmly connected thereto.

All embodiments of the flow cell assembly 10 are preferably designed such that they can withstand pressures of up to at least 5 bar, preferably up to 12 bar.

It is not mandatory that the aligning structure 22 for aligning the probe head 36 and the fixing structure 24 for immovably fixing the aligned probe head 36 belong to the housing 12. The aligning structure 22 and/or the fixing structure 24 can also be formed on the glass body 14 and on the housing 12 or only on the glass body 14. It is important though that the probe head 36, when fixed in its defined position and orientation, is immovable relative to the glass body 14 to ensure defined and reproducible measurements.

It is to be understood that the various embodiments described above are examples only and that certain features of these embodiments can be combined with each other in different ways.

The flow cell assembly 10 is especially useful in downstream processes, but its implementation is not limited to this field of application.

For example, the flow cell assembly can also be used for a calibration related to a bioprocess. As mentioned in the beginning, a calibration is required if spectral raw data or information (spectra) are to be transferred to quantitative analyte predictions. This can be achieved by regression, e.g. linear regression of one or more wavelength(s) (ranges), or by multivariate data analysis, e.g. via PLS (partial least squares), OPLS (orthogonal partial least squares), MLR (multiple linear regression) algorithms.

Data acquisition requires spectral recording of samples with known analyte concentrations. This can be done in two ways: (i) either with a flow cell assembly 10 being directly integrated into a process line (calibration in process), or (ii) with the flow cell assembly 10 being used as an offline instrument.

In the first case (calibration in process), an arrangement of the flow cell assembly 10 in close proximity to a sampling point is advantageous. Reference values obtained from offline measurements of a sample with respect to one or more analytes can be linked to one or more spectra recorded with the aid of the flow cell assembly 10 at the time the sample was taken. It may be expedient to correct the sampling time by defined time units to account for the specific position of the flow cell assembly 10 in the process line. For example, if the sampling point is 1 m downstream of the flow cell assembly 10, the time that the medium took to travel from the flow cell assembly 10 to the sampling point might have to be taken into account when aligning the reference and spectral data. In this way, a data set with a number of spectra and a corresponding number of reference data points can be generated. Based on the data set, an analyte calculation rule (in case of regressions) or a multivariate analyte prediction model is built. The model can then be applied to new data in the process for which no reference is known. Optionally, the model can be validated by comparing predictions with newly taken samples and offline reference measurements.

On the other hand, offline calibration might be beneficial when no dedicated sampling point is provided in the process equipment. In this case, the flow cell assembly 10, especially the flow cell assembly according to the fourth embodiment, is temporarily integrated into a process line or simply connected thereto and filled with a sample, either with known analyte concentration or referencing is done after the spectral acquisition. Ideally, similar optics and a similar optical interface should be used for each acquisition. It is most beneficial when calibration samples are as similar as possible to the process medium (for example, the samples and the process medium should be based on the same buffer). In this way, a data set with a number of spectra and a corresponding number of reference data points can be generated. Based on the data set, an analyte calculation rule (in case of regressions) or a multivariate analyte prediction model is built. The model can then be applied to new data in the process with process interfaces (flow cell assemblies 10, usually with larger volumes), for which no reference is known.

LIST OF REFERENCE SIGNS 10 flow cell assembly
12 housing
14 glass body
16 inlet tube connector
18 outlet tube connector
20 holding structure
22 aligning structure
24 fixing structure
24a lugs
26 measurement channel
28 inlet end
30 outlet end
32 bypass channel
34 optical probe
36 probe head
38 windows
40 lid
42 locking clip
44 main body of the housing
46 attachment portion
48 recesses
50 grip or handle
M optical measurement axis

The invention claimed is:

1. A flow cell assembly for use in a bioprocess, the flow cell assembly comprising:
   a probe head of an optical probe,
   a housing and a glass body,
   the housing including an inlet tube connector and an outlet tube connector,
   the housing further including a holding structure for immovably holding the glass body,
   the glass body being a universal single-piece glass body surrounding a measurement channel,
   the measurement channel having an inlet end and an outlet end defining a medium flow direction,
   the measurement channel having a defined dimension along an optical measurement axis (M) perpendicular to the medium flow direction,
   the inlet end of the measurement channel being in fluid communication with the inlet tube connector of the housing,
   the outlet end of the measurement channel being in fluid communication with the outlet tube connector of the housing,
   the housing or the glass body including an aligning structure for aligning the probe head, the aligning structure being shaped to receive the probe head in a defined position and orientation, and
   the housing or the glass body including a fixing structure for immovably fixing the aligned probe head relative to the glass body in the defined position and orientation,
   wherein the probe head engages around the housing of the flow cell assembly, and the probe head is fixed in the fixing structure by a lock-in-place connection.

2. The flow cell assembly according to claim 1, characterized in that the aligning structure and the fixing structure are the same.

3. The flow cell assembly according to claim 1, characterized in that the glass body is made of quartz glass.

4. The flow cell assembly according to claim 3, wherein the glass body is manufactured by a cold casting technique.

5. The flow cell assembly according to claim 1, characterized in that the housing is made of a plastic material and suitable for beta irradiation, gamma irradiation or X-ray irradiation, or in that the housing is made of a material and suitable for steam sterilization and/or sanitization.

6. The flow cell assembly according to claim 1, characterized in that the probe head is detachably fixed relative to the glass body.

7. The flow cell assembly according to claim 1, characterized in that the housing includes a securing structure for securing the glass body against removal.

8. The flow cell assembly according to claim 7, characterized in that the housing comprises a main body and a separate locking clip serving as the securing structure, the locking clip taking a defined position relative to the main body and the glass body after insertion into a receptacle of the main body, the locking clip including the holding structure and/or the aligning structure for aligning the probe head and/or the fixing structure for immovably fixing the aligned probe head.

9. The flow cell assembly according to claim 1, characterized in that the inlet tube connector and the outlet tube connector define a main process flow direction, the medium flow direction being identical with the main process flow direction.

10. The flow cell assembly according to claim 1, characterized in that cross-sectional areas of the inlet tube connector, the outlet tube connector and the measurement channel are substantially the same.

11. The flow cell assembly according to claim 1, characterized in that, compared to a mean diameter of the inlet tube connector and the outlet tube connector, the dimension of the measurement channel along the optical measurement axis (M) is smaller and a dimension of the measurement channel in a direction perpendicular both to the medium flow direction and to the optical measurement axis (M) is greater.

12. The flow cell assembly according to claim 1, characterized in that the aligning structure and the fixing structure include recesses and spring-loaded pressure members cooperating with the recesses.

13. The flow cell assembly according to claim 1, characterized in that the housing includes a bypass channel being in fluid communication with the inlet tube connector and the outlet tube connector, the bypass channel circumventing the measurement channel.

14. The flow cell assembly according to claim 13, characterized in that an overall cross-sectional area of the measurement channel and the bypass channel is about equal to a mean cross-sectional area of the inlet tube connector and the outlet tube connector, a deviation being less than 25%.

15. The flow cell assembly according to claim 13, characterized in that, in an operating position of the flow cell assembly the bypass channel extends vertically above the measurement channel.

16. A spectroscopy device assembly for use in a bioprocess, the spectroscopy device assembly comprising the flow cell assembly according to claim 1, and a spectrometer coupled to a probe or probe head of the flow cell assembly, the spectrometer being one of the following: a UV/VIS spectrometer, a NIR spectrometer, a fluorescence spectrometer, or a Raman spectro-meter.

17. The flow cell assembly according to claim 1, wherein the probe head is configured to perform a transmission measurement.

* * * * *